United States Patent [19]
Plichta et al.

[11] Patent Number: 5,599,643
[45] Date of Patent: Feb. 4, 1997

[54] LITHIUM ELECTROCHEMICAL CELL INCLUDING LITHIUM COPPER OXIDE IN THE CATHODE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 555,247

[22] Filed: Nov. 8, 1995

[51] Int. Cl.$^6$ ................................................ H01M 4/48
[52] U.S. Cl. ................................................ 429/220
[58] Field of Search ................................ 429/220, 198

[56] References Cited

U.S. PATENT DOCUMENTS

| | | | |
|---|---|---|---|
| 4,172,927 | 10/1979 | Toyoguchi et al. | 429/220 X |
| 4,939,049 | 7/1990 | Ishibashi et al. | 429/220 X |
| 5,472,809 | 12/1995 | Perton et al. | 429/198 X |

FOREIGN PATENT DOCUMENTS 53-46636  9/1978  Japan.

*Primary Examiner*—Stephen Kalafut
*Attorney, Agent, or Firm*—Michael Zelenka; William H. Anderson

[57] ABSTRACT

A new cathode material, $Li_2CuO_2$, is used in lithium electrochemical cells.

4 Claims, 3 Drawing Sheets

LITHIUM ELECTROCHEMICAL CELL INCLUDING LITHIUM COPPER OXIDE IN THE CATHODE

GOVERNMENT INTEREST

The invention described herein may be manufactured, used, and licensed by or for the Government for governmental purposes without the payment to us of any royalty thereon.

FIELD OF INVENTION

This invention relates in general to electrochemical cells and in particular to lithium electrochemical cells including lithium copper oxide in the cathode.

BACKGROUND OF THE INVENTION

A number of lithium electrochemical cells have been investigated over the past twenty to thirty years. In general, these cells are comprised of a lithium metal, lithium metal alloy or an intercalation compound of graphite and petroleum coke with lithium metal as the anode, a lithium ion conducting electrolyte and a cathode material that is capable of intercalating lithium ions. Examples of lithium ion conducting electrolytes are solutions of lithium salts dissolved in organic solvents, lithium ion conducting polymer electrolytes and lithium ion conducting solid electrolytes. Examples of the lithium salts are lithium perchlorate, lithium tetrachloroaluminate, lithium hexafluoro phosphate, lithium tetrafluoroborate, lithium hexafluoroarsenate, and lithium tetrafluoromethane sulfonamide. Examples of the organic solvents are propylene carbonate, diethyl carbonate, dimethyl carbonate, methyl formate, methyl acetate, ethylene carbonate, butyrolactone, 1,3 dioxolane, and dimethoxy ethane. Examples of lithium ion conducting polymer electrolytes are lithium salts dissolved in polymers such as polyethylene oxide (PEO), 2-(2-methoxy-ethoxy-ethoxide) polyphosphazene (MEEP), polyacrylonitrile (PAN). Examples of lithium ion conducting solid electrolytes are lithium iodide, lithium germanium vanadate and LISICON. The cathode is generally comprised of materials such as lithium cobalt oxide, lithium nickel oxide, lithium manganese oxide, titanium disulfide, molybdenum trioxide etc. that are capable of intercalating and deintercalating with lithium during the discharge and charge operations, respectively. The cathode materials used in rechargeable lithium ion cells are in general compounds of strategic metals. There is a need to find cathode materials made of common metals which can intercalate with lithium metal and are also in abundant supply in nature.

SUMMARY OF THE INVENTION

The general object of the invention is to reduce the cost of lithium electrochemical cells. A more specific object of the invention is to provide a low cost cathode for such an electrochemical cell so that the low cost cathode can intercalate with lithium metal.

It has now been found that the aforementioned objects can be attained by the use of lithium copper oxide as the cathode in lithium electrochemical cells.

DESCRIPTION OF THE DRAWINGS AND THE PREFERRED EMBODIMENT

Lithium copper oxide ($Li_2CuO_2$) is prepared by pressing a pellet of thoroughly mixed powders of 1.498 grams of cupric oxide (CuO) and 1.478 grams of lithium carbonate ($Li_2CO_3$) in a 23 mm die at a pressure of 20,000 lbs. The pressed pellet is heated in a ceramic boat in a tube furnace under an airflow of 2 liters per minute at 400° C. for 2 hours followed by heating at 700° C. for 3 days.

Figure 1:
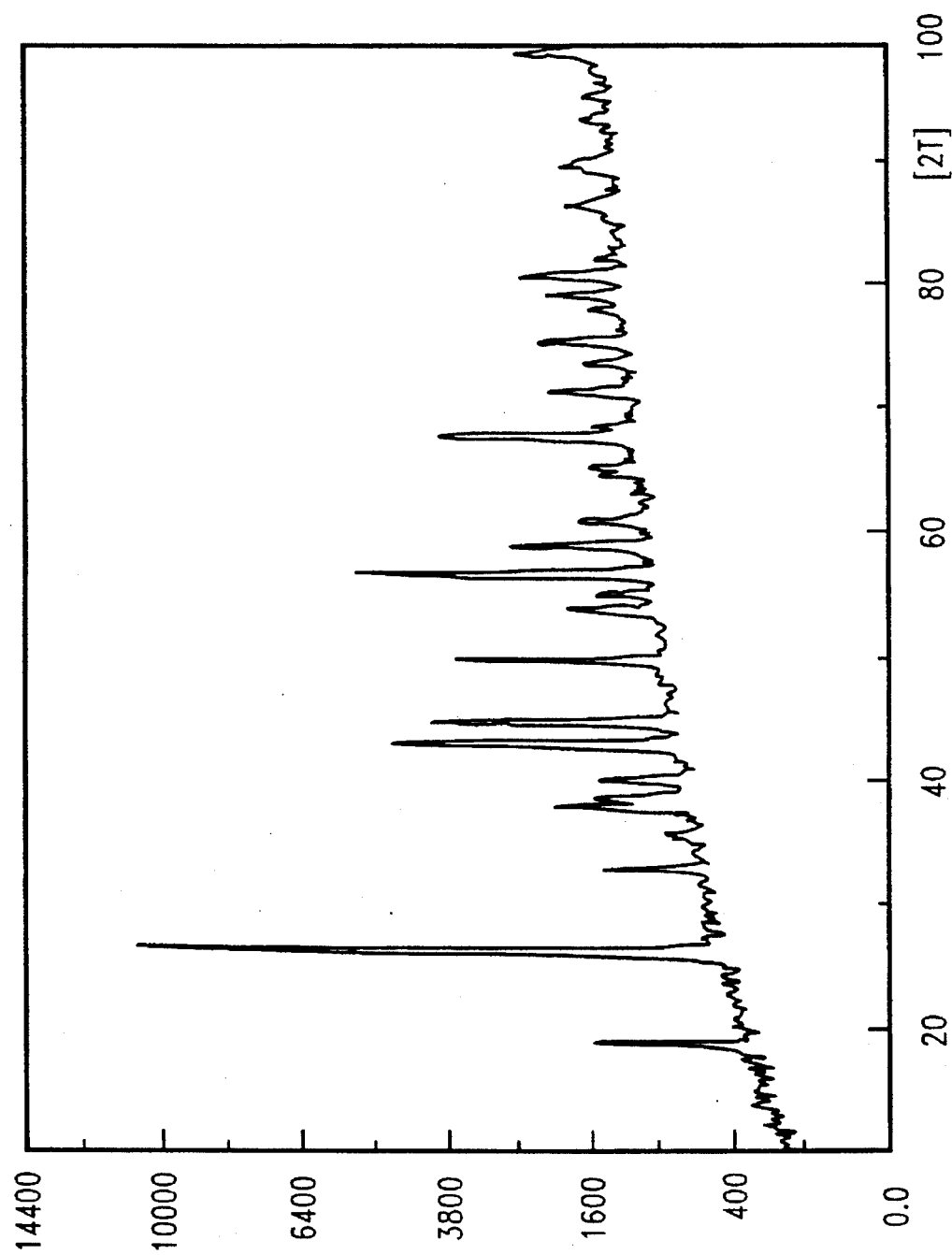
FIG. 1 is an X-ray diffraction of the prepared material lithium copper oxide using a copper $K_\alpha$ radiation source.

Referring to FIG. 1, the X-ray powder diffraction pattern of the prepared material using a copper $K_\alpha$ radiation source is given in FIG. 1 and is representative of the $Li_2CuO_2$ compound. Lithium copper oxide cathodes are prepared by roll pressing a mixture of 65 weight percent $Li_2CuO_2$, 30 weight percent Shawinigan Carbon Black powder and 5 weight percent Teflon powder onto an expanded aluminum screen to a thickness of about 0.5 mm.

Electrochemical cells are made using the $Li_2CuO_2$ cathode, a lithium anode, and an organic electrolyte solution that consists of 1 molar lithium trifluoromethanesulfonamide, $Li(CF_3SO_2)_2N$, in a mixture of 50 vol % 1,3 dioxalane, 40 vol. % 1,2 dimethoxyethane and 10 vol % propylene carbonate. Cells are assembled using flag electrodes of the anode and of the cathode, separated with a layer of Celgard 2400 polypropylene separator and a glass fiber paper. The polypropylene separator is adjacent to the anode and the glass separator is adjacent to the cathode and is used to absorb the electrolyte. Freshly prepared cells exhibit open circuit potentials of 3.1 V.

The cell is first charged at a current density of 1 mA/cm² to a voltage of 3.8 volts. The charging process results in the deintercalation of lithium from the ($Li_2CuO_2$) electrode forming $Li_{2-x}CuO_2$ where 0<x<2. The amount of lithium deintercalated, that is, x is calculated to be 0.7 F/mole from the total charge of 9.22 mAh (171 mAh/g of $Li_2CuO_2$) consumed during the charging operation. The lithium ions generated at the electrode are transported through the electrolyte and then deposited at the lithium electrode. The cell is then discharged at a current density of 1 mA/cm² to 1.5 V and gives a discharge capacity of 0.41 F/mole (101 mAh/gram of $Li_2CuO_2$) at an average cell voltage of 2.61 volts. The electrode reaction referred to above during the charging process is reversed during discharge and thus the lithium ions generated at the lithium negative electrode are transported through the electrolyte and are intercalated with the $Li_{2-x}CuO_2$ positive electrode to regenerate $Li_2CuO_2$. The charge and discharge reactions at the positive electrode can be represented by the following equation:

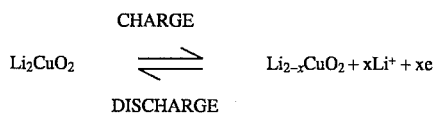

$$Li_2CuO_2 \underset{\text{DISCHARGE}}{\overset{\text{CHARGE}}{\rightleftharpoons}} Li_{2-x}CuO_2 + xLi^+ + xe$$

where 0<x<2.

Figure 2:
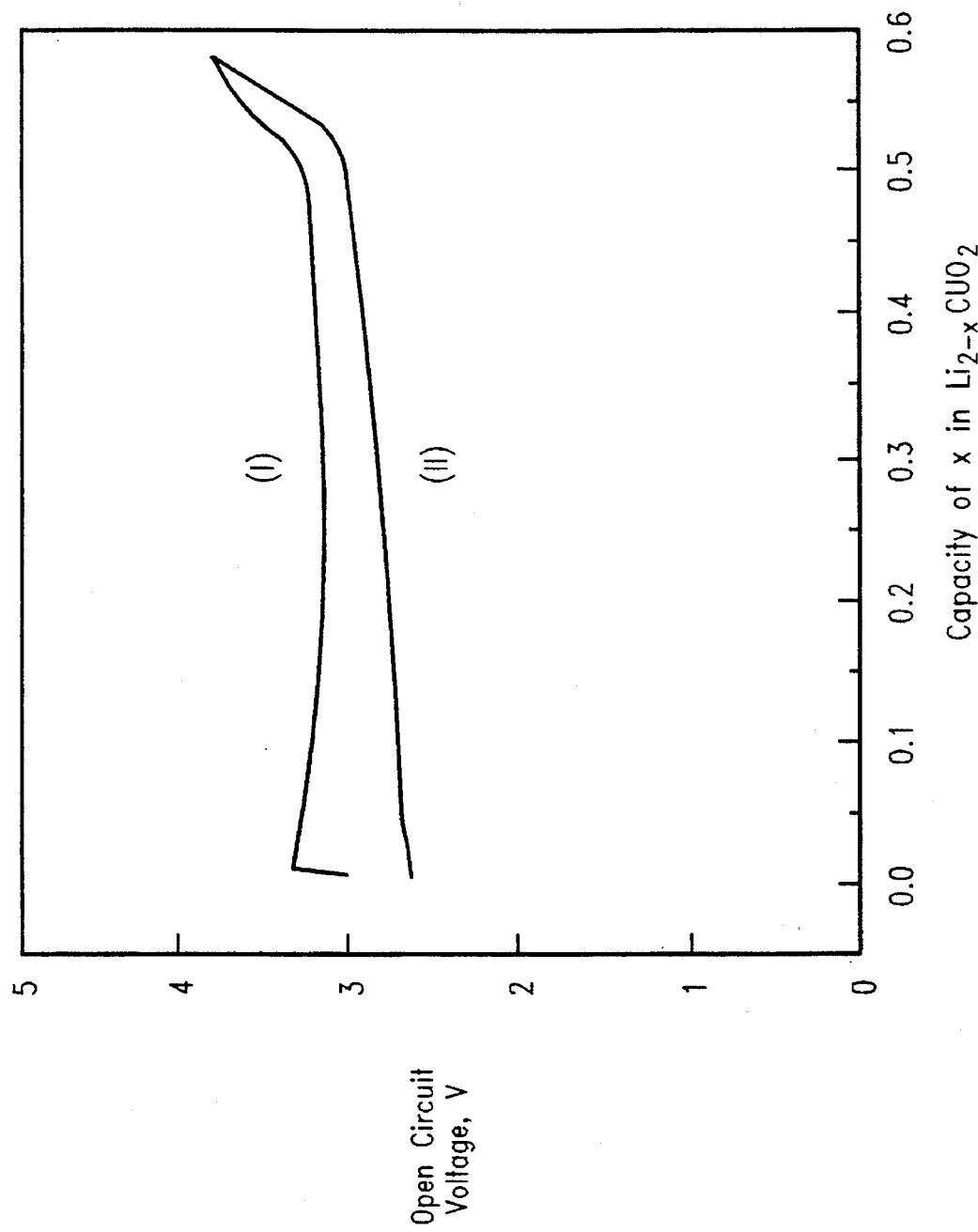
FIG. 2 shows the open circuit voltages of the $Li_2CuO_2$ cathode versus a lithium content in the cathode during the first charge/discharge cycle.

Referring to FIG. 2, curves I and II represent the open circuit voltages during charge and discharge, respectively. The average open circuit voltage during discharge is found to be 2.87 volts resulting in a theoretical energy density of 700 Wh/kg for 1 F/mole capacity of the $Li_2CuO_2$ cathode.

Figure 3:
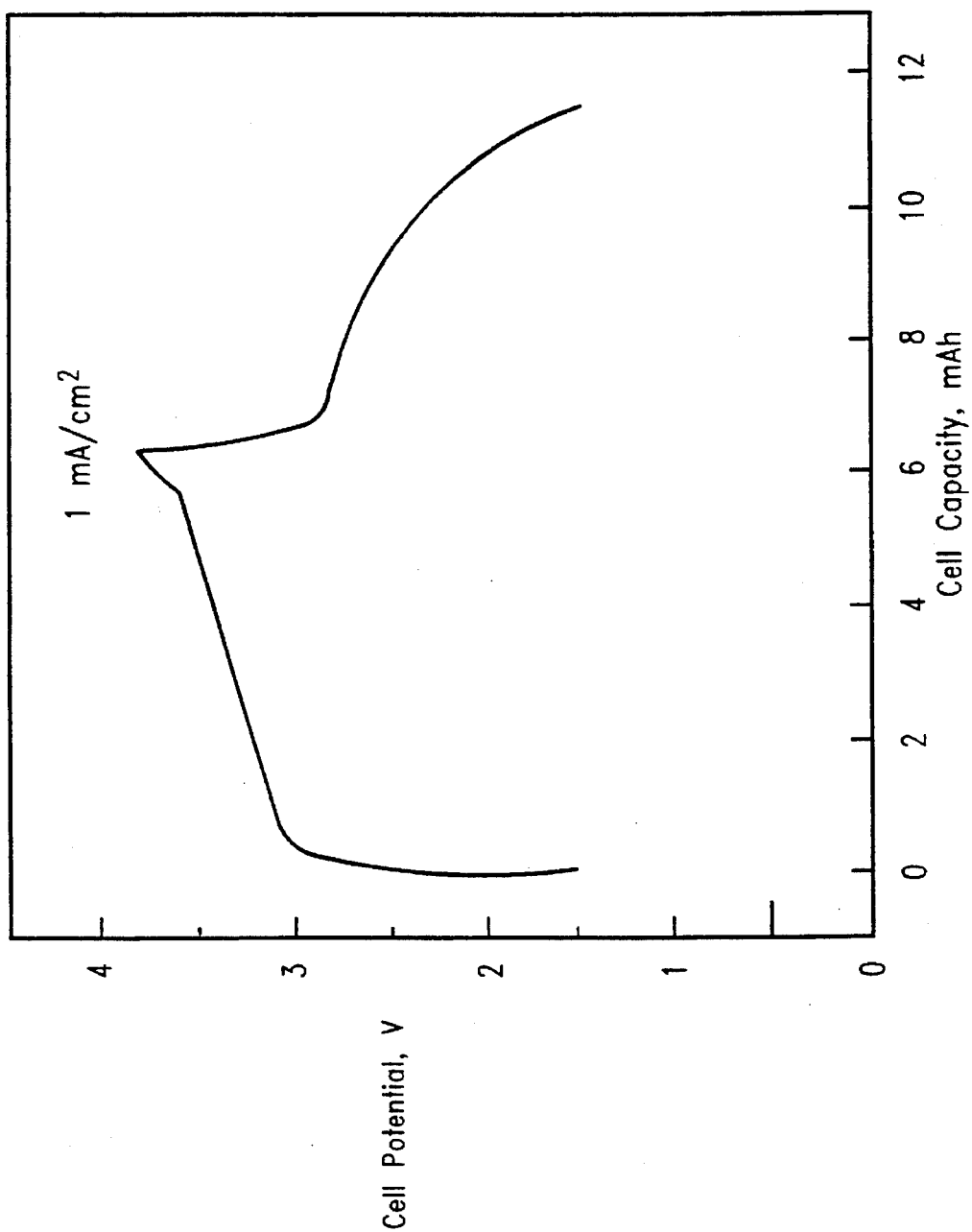
FIG. 3 shows a typical charge/discharge cycle characteristic of the electrochemical cell.

Referring to FIG. 3, a total charge of 0.39 Faradays per mole (95 milliamperehours per gram) is recovered during the discharge compared to a charge of 0.48 Faradays per mole (118 milliamperehours per gram) consumed during the charging process. The average voltage during discharge at a current density of 1 mA/cm$^2$ is 2.6 volts.

If the cells are charged to 4.5 V, a second voltage plateau is observed during discharge at about 3.3 V. However, the cell charging voltage is limited to 3.8 V to avoid any electrochemical oxidation of the organic solvent that results in poor cycle life of the cell. The cells are also not discharged below 1.6 volts in order to prevent the further reduction of $Li_{2-x}CuO_2$ to form lithium oxide ($Li_2O$) and copper.

The discharge of the cell to 1.0 V results in an increase in cathode capacity but it is found that the electrochemical reaction shows limited reversibility so that $Li_2CuO_2$ is not regenerated during the subsequent charging cycle. Thus the cells are only cycled between 3.8 volts and 1.6 volts in which range the electrochemical reactions at the positive electrode correspond to the de-intercalation and intercalation of lithium during the charge and discharge operations, respectively.

In lieu of lithium metal, other alkali and alkaline earth metals and their alloys or intercalation compounds with materials such as graphite, carbons, and petroleum cokes can be used as anodes in the electrochemical cell.

The lithium copper oxide cathode material can be used in rechargeable or primary electrochemical cells.

We wish it to be understood that we do not desire to be limited to the exact details of construction shown and described for obvious modifications will occur to a person skilled in the art.

What is claimed is:

1. An electrochemical cell including a lithium containing material as the anode, a lithium ion conducting electrolyte, and lithium copper oxide as the cathode wherein the lithium containing material used as the anode is taken from the group consisting of lithium metal, lithium metal alloy, and intercalation compounds of graphite, carbon and petroleum coke with lithium, wherein the lithium ion conducting electrolyte comprises a conducting lithium salt in an organic solvent, wherein the conducting lithium salt is selected from the group consisting of lithium perchlorate, lithium tetrachloroaluminate, lithium hexafluorophosphate, lithium tetrafluoroborate, lithium hexafluoroarsenate, and lithium tetrafluoromethane sulfanamide, wherein the organic solvent of the electrolyte is selected from the group consisting of at least one solvent taken from the group of propylene, carbonate, diethyl carbonate, dimethyl carbonate, methyl formate, methyl acetate, ethylene carbonate, butyrolactone, 1,3 dioxolane, and dimethoxyethane, and wherein the cathode contains $Li_2CuO_2$.

2. An electrochemical cell according to claim 1 wherein the anode is lithium, the electrolyte is an organic electrolyte solution of about 1 molar $Li(CF_3SO_2)_2N$ in a mixture of about 50 vol % 1,3 dioxolane, about 40 vol % 1,2 dimethoxyethane, and about 10 vol % propylene carbonate, and the cathode is $Li_2CuO_2$.

3. An electrochemical cell according to claim 2 wherein the cathode is prepared by heating a mixture of CuO and $Li_2CO_3$ in air at about 400° C. to about 700° C.

4. A rechargeable cell containing $Li_2CuO_2$ as the cathode active material.

* * * * *